Dec. 8, 1925.    L. J. BROWN    1,564,196
SAFETY DEVICE FOR RAILROAD CAR BRAKE BEAMS
Filed March 14, 1925
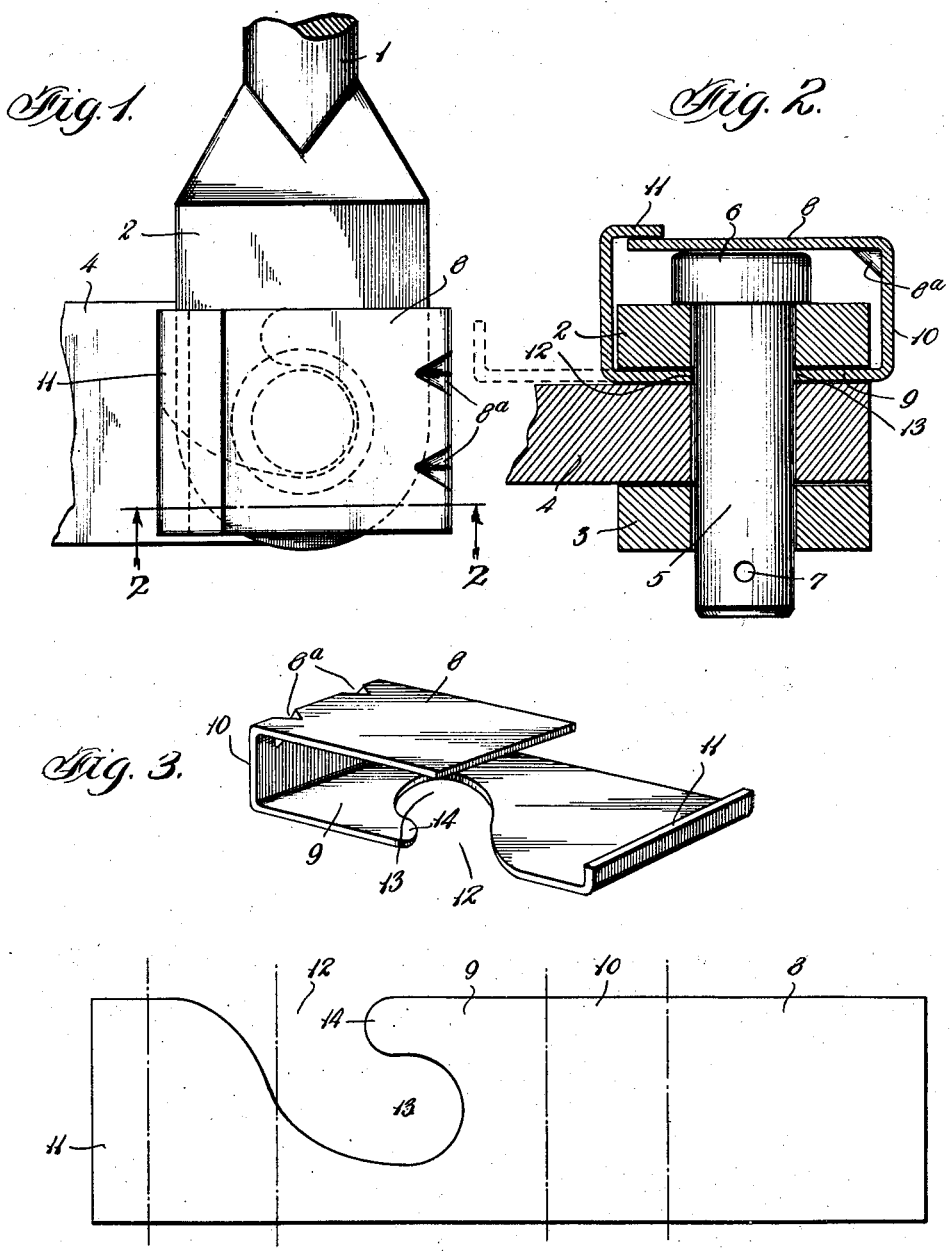

Patented Dec. 8, 1925.

1,564,196

UNITED STATES PATENT OFFICE.

LLOYD J. BROWN, OF EVANSTON, ILLINOIS, ASSIGNOR TO E. PAYSON SMITH, OF SPRINGFIELD, ILLINOIS.

SAFETY DEVICE FOR RAILROAD-CAR BRAKE BEAMS.

Application filed March 14, 1925. Serial No. 15,694.

*To all whom it may concern:*

Be it known that I, LLOYD J. BROWN, a citizen of the United States, residing at Evanston, in the county of Cook and State of Illinois, have invented certain new and useful Improvements in Safety Devices for Railroad-Car Brake Beams, of which the following is a description.

This invention relates to improvements in safety devices for railroad rolling stock including locomotives, generally, but more particularly for brake levers and the like.

The primary object of my invention is to provide a safety device which can be quickly applied and detached without removing the brake pin from its normal operative position.

A further object of my invention is to provide a safety device which can be made of one standard size that will fit practically all locations in which such a device is used and which due to its manufactured form as shown in Figure 3 is more correctly applied than other types resulting in greater efficiency.

Car repairers and car builders, at times, fail to spread the cotter keys which are commonly used to lock the pins for brake levers, brake hanger, and brake fulcrums, and in other locations where pins are used, which leaves the cotters free to work out under service conditions whereupon the brake rigging is free to fall to the track, and cause a wreck.

If the brake rigging falls the air brake mechanism is out of service rendering the brakes inoperative. The United States safety appliance regulations require the brake to be in good braking condition and they attach a penalty defect to cars found in this condition and the fines levied by the commission amount during the year to a considerable sum against a railroad.

Among other advantages resulting from my invention may be mentioned the fact that where my device is used a shorter brake pin may be used than where a cotter pin is used, besides which it is not necessary to drill a cotter pin hole through the pin. Some railroads prefer to use the usual length of brake pin and also the cotter pin, but this does not prevent the use of my improved safety device.

My invention consists of a flat plate body bent to the shape shown in the drawings which can be secured to and detached from the pin after the parts and pin are in their operative position, and securely locks the pin in place against accidental loss, and likewise prevents the dropping of the parts.

In the drawings—

Figure 1 is a top plan view of portions of a connection rod and brake lever with my safety device applied.

Figure 2 is a sectional view on the line 2—2 Figure 1.

Figure 3 is a perspective view of my safety device in form to be applied.

Figure 4 is a plan view of the flat blank from which my device is formed, the dotted lines designating the bending zones.

The reference numeral 1 designates the connection rod having the forked ends 2 and 3 between which the end of the brake lever 4 is secured by means of the pin 5, which is provided with a head 6 at one end and a cotter pin hole 7 at the other end.

My improved safety device comprises two arms 8 and 9 substantially parallel and spaced from each other by the spacing member 10. The arm 9 is materially longer than the arm 8 as clearly shown in Figure 3 and is provided at its free end with an upstanding flange or stop 11 extending the full width of the arm. Intermediate the flange or stop 11 and the spacing member 10 a pin opening 13 is formed through the arm 9 which by means of an oblique port 12 opens at one side edge of the arm, the port being inclined toward the free end of the arm 10, and the flange 11. The arm 9 overhangs, but is spaced from the opening 13 and port 12 as clearly shown in the drawings, the object of which will be apparent from the description herein.

When the end of the brake lever is inserted between the forked ends 2 and 3 of the connection rod, and the holes in these elements are in alignment, the pin 5 is passed through the holes in said elements thereby securing the connecting rod and brake beam together in the usual manner. The arm 9 is now slipped between the brake lever and the forked end 2, of the connection rod, the pin passing through the port 12 to the opening 13 in which position the arm 8 overlies the head of the pin 5, the flange 11 and the free end portion of the arm 9 lying in the dotted line position shown in Figure 2. This free end portion of the arm 9 is then bent upward in any suitable manner the bending being against and resisted by the inner corner edge of the fork end 2, sets up a drawing or pulling action on the arm 9 which insures the pin 5 being fully sealed in the opening 13 and under the overhang 14 and continued bending of the arm 9 to the full line position shown in Figure 2 forms a right angle bend in the arm which prevents the arm moving or sliding and holds the pin 5 securely in its opening 13 under the overhang whereby the device cannot become disengaged from the pin accidentally. It will be seen in Figure 2 that the flange or stop 11 overlies the free end of the arm 8 and prevents it from being bent upward off of or out of the path of the pin 5, whereby the pin 5 is securely locked in position.

The arm 8 may be rigidified by forming the ribs 8$^a$ by die or other device.

This form of safety device will facilitate very materially the insertion and removal of the pin 5 because in the use of the devices now in vogue the repairers have to line up the pin openings in the parts as well as the opening in the device simultaneously which is a difficult thing to do as the parts are heavy and awkward to handle and the work is most difficult at times due to the close quarters in which the work must be performed around and under the cars where the car repairers must work.

My device obviates these objections and difficulties as it can be applied in an almost complete form after the parts have been assembled.

Lock devices that have to be bent over the head of the pin by hand application are not always driven down to proper position relative to the head of the pin as it is difficult to do so at times due to close quarters in which the men are compelled to work.

What I claim is:

1. A safety device of the character described comprising a flat body having an undercut recess from one side edge thereof, and a stop at one end of said body.

2. A safety device of the character described comprising a flat body having near one end thereof an undercut recess from one side edge thereof, and a stop at that end of the body nearest said recess.

3. A safety device of the character described comprising a flat body having an upturned end, and an undercut recess extending from one side edge of said body.

4. A safety device of the character described, comprising a flat body having an upturned end, and an undercut recess extending from one edge of the body, and a guard member spaced from but integral with said body and extending over said recess.

5. As a new article of manufacture ready for use, a safety device of the character described comprising two spaced arms one of which is longer than the other, an undercut recess in the longer arm opening on one side edge thereof.

6. As a new article of manufacture ready for use, a safety device of the character described comprising two spaced arms one of which is longer than the other, an undercut recess in the longer arm opening on one side edge thereof said recess being beneath the short arm.

7. As a new article of manufacture ready for use, a safety device of the character described comprising two spaced arms one of which is longer than the other, an undercut recess in the longer arm opening on one side edge thereof said recess being beneath the short arm and an upstanding flange on the end of the longer arm.

8. A safety device of the character described comprising two arms, one longer than the other, a spacing member integrally connecting said arms at one end, rigidifying elements extending between the shorter arm and spacing member, an undercut recess in the longer arm opening on the side edge thereof, and an upstanding flange on the free end of the longer arm.

In testimony whereof I affix my signature.

LLOYD J. BROWN.